(12) United States Patent
Chervakov et al.

(10) Patent No.: US 8,557,446 B2
(45) Date of Patent: Oct. 15, 2013

(54) PROTON-CONDUCTING POLYAMIDE POLYMER MEMBRANE AND METHOD FOR PRODUCTION

(75) Inventors: Oleg Chervakov, Dnipropetrovsk (UA); Elena Shembel, Coral Springs, FL (US); Yu Kobelchuk, Dnipropetrovsk (UA); Konstanlyn Gerasymenko, Dnipropetrovsk (UA)

(73) Assignee: Enerize Corporation, Coral Springs, FL (US)

( * ) Notice: Subject to any disclaimer, the term of this patent is extended or adjusted under 35 U.S.C. 154(b) by 1078 days.

(21) Appl. No.: 11/891,548

(22) Filed: Aug. 11, 2007

(65) Prior Publication Data
US 2008/0064831 A1     Mar. 13, 2008

Related U.S. Application Data

(60) Provisional application No. 60/837,517, filed on Aug. 14, 2006.

(51) Int. Cl.
*H01M 10/0562*     (2010.01)
*H01M 6/18*         (2006.01)
*H01M 2/16*         (2006.01)

(52) U.S. Cl.
USPC ............ 429/314; 429/304; 429/306; 429/247

(58) Field of Classification Search
USPC ............ 429/33, 247, 249, 251, 304, 306, 314
See application file for complete search history.

(56) References Cited

U.S. PATENT DOCUMENTS

2005/0196658 A1 * 9/2005 Sonai et al. ..................... 429/33

* cited by examiner

*Primary Examiner* — Julian Anthony
(74) *Attorney, Agent, or Firm* — Morgan Lewis & Bockius LLP; Richard F. Trecartin

(57) ABSTRACT

The present invention involves the synthesis, preparation and use of a new family of proton conducting polymer membranes. These proton-conducting polymer membranes are produced from the products of joint condensation of polyamides with sulfonated aromatic derivatives of aldehydes in the presence of solvent and acid catalyst. The resulting products have low equivalent weight, high ionic conductivity at room temperature, excellent proton function value, and insignificant change of geometrical size due to swelling in water and acid solutions. The products exhibit high mechanical strength and thermal stability to more than 150° C., well in excess of that for poly-fluorinated compounds presently used in electrochemical membranes and sensors.

19 Claims, 5 Drawing Sheets or

| Molar ratio PA-6:PSA:CH$_2$O | Ion exchange capacity, mg-eq/g | Conductivity, Om$^{-1}$·cm$^{-1}$ | σ MPa | Elongation, % | Water uptake, % |
|---|---|---|---|---|---|
| 1 : 0.75 : 1.5 | 1.65 | 1.0E-3 | - | - | 301 |
| 1 : 0.5 : 1.5 | 1.32 | 5.9E-4 | 20.62 | 2.7 | 146 |
| 1 : 0.5 : 1 | 1.20 | 5.2E-4 | 18.76 | 3.3 | 129 |

Fig.6

| Swelling time, t, hours | Resistance R, Ohm | Thickness L, mkm | ρ, Ohm*cm | Conductivity | | log(S) |
| | | | | S, cm$^2$ | S, Ohm$^{-1}$ *cm$^{-1}$ | |
|---|---|---|---|---|---|---|
| Non-modified ( R$_1$ = H) | | | | | | |
| 24 | 7.338 | 170 | 431.62 | 3.75 | 6.18E-04 | -3.209 |
| 48 | 0.911 | 317 | 362.01 | 3.75 | 7.37E-04 | -3.133 |
| 168 | 0.844 | 317 | 359.61 | 3.75 | 7.42E-04 | -3.130 |
| Modified (R$_1$ = Alk) | | | | | | |
| 24 | 5.870 | 399 | 265.0 | 1.80 | 3.78E-03 | -2.422 |

PROTON-CONDUCTING POLYAMIDE POLYMER MEMBRANE AND METHOD FOR PRODUCTION

CROSS-REFERENCE TO RELATED APPLICATIONS

Pending Provisional Patent Application 60/837517 having the same title filed Aug. 14, 2006

FEDERALLY SPONSORED RESEARCH

None

SEQUENCE LISTING

None

FIELD OF THE INVENTION

This invention relates to clean energy and specifically to synthesis, preparation and production of cross-linked ion-conducting polymer materials with electrochemical and thermal stability characteristics that make them useful as membranes in energy production devices such as fuel cells, as well as in chemical and biological sensors.

BACKGROUND

Design advances in high-performance electrochemical systems such as fuel cells, sensors, and the like depend on the availability of polymer materials that exhibit high ionic conductivity and chemical and thermal stability, as well as good mechanical strength characteristics, over a wide range of operating temperatures. Among the variety of materials used for these purposes, ionogenic polymers (ionomers) are considered suitable polymer matrices for proton-conducting membranes and electrode materials.

Ionomers are important components of semi-permeable membranes, which allow specific particles (in this case ion species) to pass through while retaining others. Membranes made with ionomers can be fairly ion-specific or ion-selective. Ionomer-based materials of most interest for electrochemical applications such as fuel cells are those that selectively pass hydrogen ions (protons).

An important ion-selective membrane material in current use as a fuel cell membrane material is a perfluorosulfonate ionomer made by DuPont under the brand name Nafion®. Such perfluorosulfonate ionomers have adequate thermal stability up to approximately 90° C., and the ability to absorb adequate amounts of water. These perfluorosulfonated polymers (Nafion-type) are the most widely used proton-conducting materials for fuel cell membranes. However, their high cost and limited operational temperature range are significant disadvantages, especially at higher fuel cell operating temperatures. The thermal stability of perfluorosulfonated polymers is insufficient above 90° C. For example, the lifetime of Nafion 117 at 120° C. is only 30-45 days. The disadvantages of high cost and low stability at higher temperatures severely limit the application of these materials to advanced (i.e. low cost and high temperatures) electrochemical systems.

For this reason, there has been increased interest in development of new non-fluorinated proton conducting materials that cost less and perform better as fuel cell membranes than does Nafion. Such non-fluorinated materials have been shown capable of operating in fuel cells at temperatures in excess of 120° C. Above this temperature, water evaporation from the membrane leads to a dramatic drop in conductivity.

There are a number of reasons that higher temperature ion-selective membranes would be of value in electrochemical applications such as fuel cells. The first is that kinetic rates of electrochemical reactions generally increase with increasing temperature, resulting in improved fuel cell performance. Another advantage of high temperature operation (~150° C.) is that Pt catalyst poisoning by trace amounts of CO, which can be present in hydrogen fuels, is greatly reduced or eliminated.

In summary, the desired characteristics of membranes for fuel cells for both mobile and stationary applications are as follows:
1. Operation at a temperatures of 120-150° C.,
2. Low resistance (high proton conductivity) under cell operating conditions,
3. Long-term chemical and mechanical stability at elevated temperatures in oxidizing and reducing environments,
4. Good mechanical strength, preferably with resistance to swelling,
5. Low gas cross-over (pinhole free),
6. Interfacial compatibility with catalyst layers,
7. Low cost,
8. Minimal or zero dependence on tightly controlled humidity.

BRIEF DESCRIPTION OF THE INVENTION

The present invention involves the synthesis, preparation and application of a new family of proton-conducting polymer membranes. These proton-conducting polymer membranes are produced through the joint condensation of polyamides with sulfonated aromatic derivatives of aldehydes in the presence of solvent and acid catalyst.

The resulting products have a high ion exchange capacity (IEC) and high ionic conductivity at room temperature. In addition they exhibit excellent proton function values and insignificant swelling from soaking treatment with water and acid solutions. The products exhibit high mechanical strength and thermal stability to more than 150° C., well in excess of that for perfluorinated polymeric materials presently used in electrochemical devices like fuel cell and sensors.

Thus the various embodiments of cross-linked sulfo-acid polyamide polymers of the present invention meet the criteria for membrane materials with the desired physical and electrochemical characteristics for use in fuel cell and bio-sensor applications as described above. It should be noted that materials of the present invention, exhibiting superior thermal stability and electrochemical characteristics, can be produced at a significantly lower cost than can the conventional perfluorinated polymeric materials.

BRIEF DESCRIPTION OF THE DRAWINGS

FIG. 6. Properties of sulfo-acid derivatives of polyamide-6 as a function of various compositions within the intended scope of this invention.

FIG. 7. Conductivity of modified and non-modified polyamide-6 membranes for different swelling times at room temperature, with data provided for both $R_1$=H and $R_1$=Alk embodiments.

DETAILED DESCRIPTION OF THE INVENTION

Figure 1:
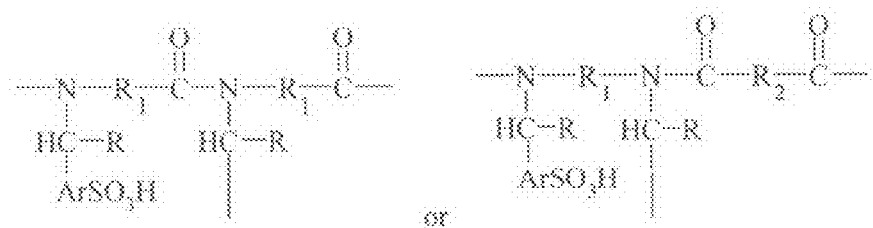
FIG. 1. Common structure of one embodiment of the present invention showing the positions where substitutions can be made within the intended scope of the present invention.

The composition of matter comprising the present invention and its means of synthesis addresses the above-described requirements for a useful proton-conducting through the development of new non-fluorinated proton-conducting polymers. An element of this invention is the method of synthesis of aromatic-containing, cross-linked polymers having high thermal stability and a high proportion of functional groups with mobile protons.

In addition, the polyamide-based polymers of the present invention exhibit a large capacity for holding water without undue swelling. These materials may be physically formed by casting. This capability is an important attribute when the material is to be used for membranes, including fuel cell membranes and the like. A further element of the present invention is the use of these polymers as membranes in electrochemical devices such as fuel cells and sensors.

In arriving at the present formulations for the subject polyamide materials, there were interim attempts to produce ion-conducting materials based on polyarylenes (poly-n-xylylene, poly(phenylene oxides), polysulfone, polyester sulfones, and polyester ketones), which are all polymers with a high chemical and thermal stability. [U.S. Pat. No. 6,090,895 (525/330.9) Crosslinked ion conductive membranes/S. S. Mao, S. I. Hamrock, D. A. Ylitalo]. However, while sulfonation of this class of polymers resulted in materials with proton conductivity, many such materials are quite water soluble.

Thus, the realization of this process, even in a homogeneous medium, did not result in the production of materials with a regular alternation of ionogenic groups. That is, the resulting polymers were not composed of regularly alternating structures. Accordingly, using this approach, the desired reproducibility of critical properties was not achieved.

It is important to synthesize sulfonated materials with a high ion exchange capacity (IEC) value. The IEC characterizes concentration of ionogenic sulfo-acid groups per unit mass of dry polymer membrane (for Nafion for example, this value is ~1 meq/g). However, polymers with high IEC values, as a rule, are too highly soluble in water and methanol to be of real value as membranes in electrochemical devices.

A production method for cation exchange materials based on polyamide, phenol sulfo-acid and formaldehyde in sulfuric acid environment is known [Kapro I. Przemysl Chemiczny.—1962.—V.41,No6.—P. 328-331]. By this method it is possible to obtain materials with high ion exchange capacity (IEC up to 1.84 meq./g).

This reaction may be carried out with a large excess of a sulfuric acid with fairly high reactions rates at room temperature. This leads to rapid gelatinization of the interaction products, and obtaining suitable film materials practically is impossible. In this case, the process of synthesis is not controlled and the final synthesis products of are dark in color, indicating that destruction of the polyamide has taken place during the process.

In consideration of the above, synthesis methods for polycondensation of polymers from sulfonated monomers, resulting in cross-linked polymer film materials were developed. These materials show a high IEC value and have regularly alternation of ionogenic groups along the chain. Thus, an element of the present invention is a synthesis method for proton-conducting film material based on the poly-condensation products of polyamides, aromatic sulfo-acids and aldehydes in the presence of catalytic quantities of sulfuric acid.

Figure 2:
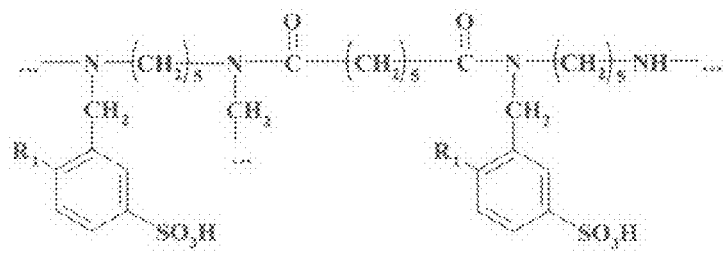
FIG. 2. Structure of the cross-linked polyamide-6 of the present invention showing the positions where substitutions can be made within the scope of the present invention.

As shown below and in FIGS. 1 and 2 the synthesized films have a cross-linked structure:

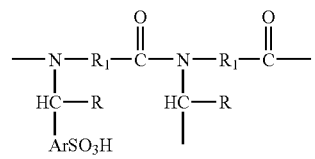

or alternatively;

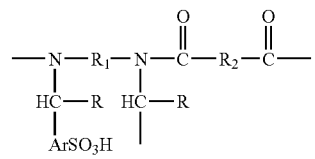

where R—multifunctional aliphatic, aromatic or heterocyclic radical;
Ar—bi-functional aromatic radical, in particular, residue of phenol, alkyl phenyl ether, naphthalene;
$R_1$, $R_2$—bi-functional, aliphatic or aromatic substituted or free radical.

Polyamides polymers may be obtained by:
polycondensation reactions of lactams:

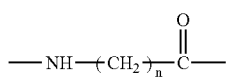

polycondensation of dibasic acid or their chloranhydride with diamines:

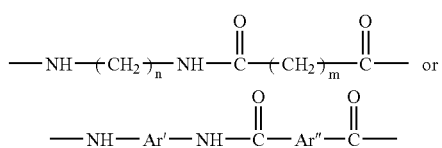

where Ar' or Ar'' are substituted or unsubstituted aromatic radicals.

As sulfuric aromatic derivatives, the following can be used:
sulfuric phenol with the common structure HO—Ar—SO$_3$H;
substituted derivatives of sulfuric phenols, in particular, phenol ethers with the common structure RO—Ar—SO$_3$H; were R—alkyl C$_1$-C$_n$;
sulfuric aromatic hydrocarbons with active hydrogen atom in the aromatic ring able to reaction with aldehydes.

As aldehyde compounds of common structure:

Can be used, where R is a substituted or unsubstituted alkyl, aryl or heterocyclic radical.

As organic solvent formic acid, trichloroethanol may be used.

A summary of the synthesis scheme for proton-conducting materials based on polyamide-6, sulfuric phenol and formaldehyde is shown below:

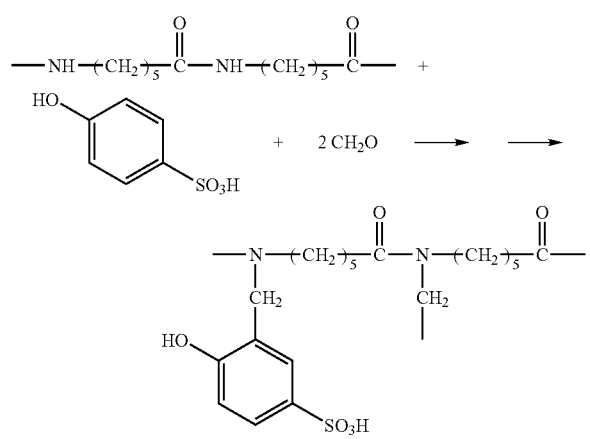

According to the present invention, films of sulfonated polyamide derivatives are produced by a polycondensation reaction of polyamide, aromatic sulfo-acid, aldehyde and catalytic quantities of sulfuric acid in an organic solvent medium. Proton-conducting membranes can be formed by casting the prepared solution on a glass surface, followed by temperature treatment at 50-80° C. for 5-10 hours. Then the film is removed from the substrate and immersed into distilled water for one day for washing and removal of un-reacted monomers. The washing operation was repeated 2-3 times with fresh distilled water.

Figure 3:
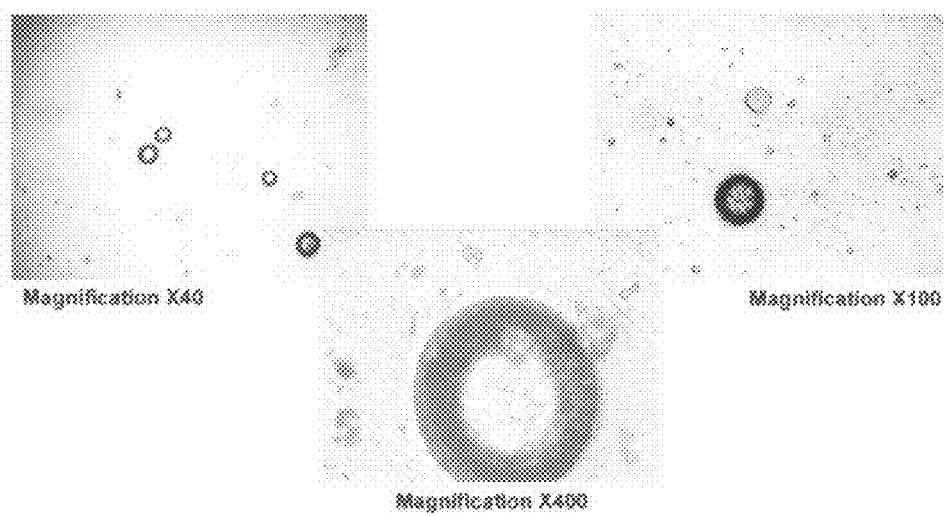
FIG. 3. Micrograph showing the appearance of a non-optimized composition of the polyamide membrane of the present invention.
Figure 4:
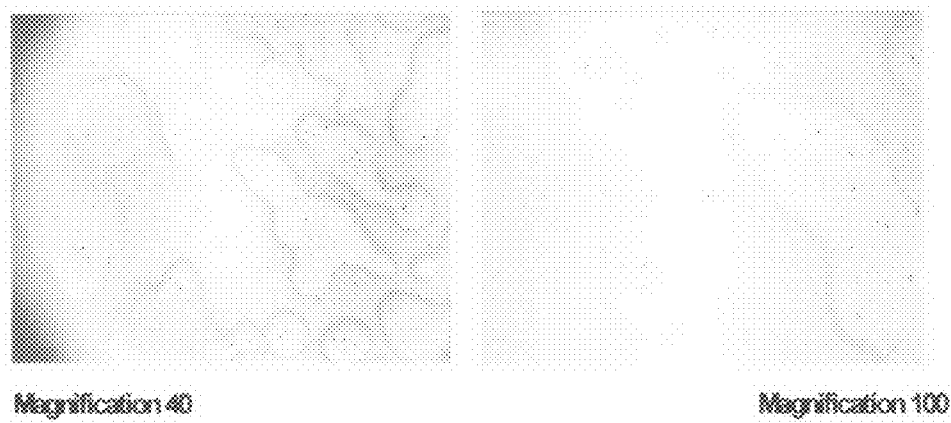
FIG. 4. Micrograph showing the appearance of an optimized composition of the polyamide membrane of the present invention.
Figure 5:
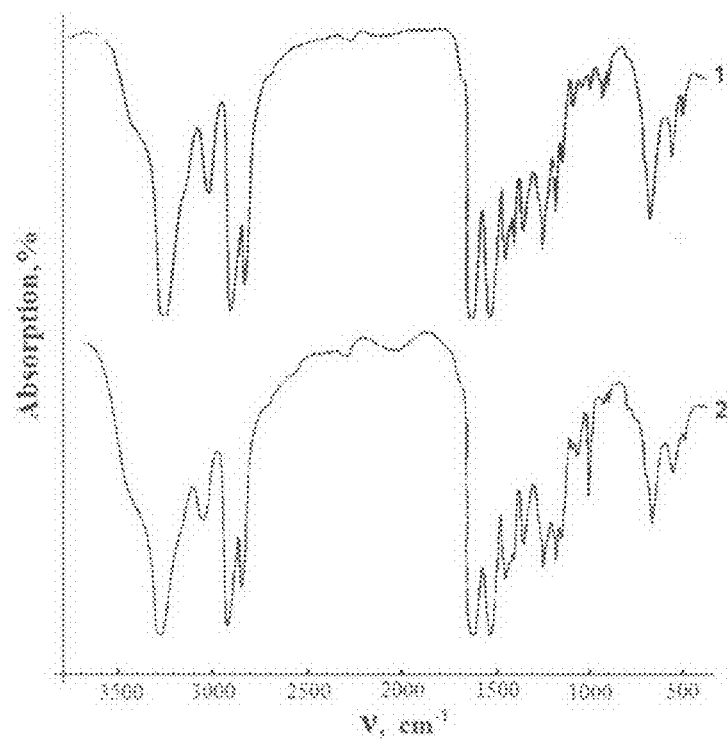
FIG. 5. IR-spectrum of polymer material films: 1 is initial polyamide-6; 2 is cross-linked sulfo-acid polyamide-6 comprising polyamide-6:phenol sulfoacid:formaldehyde (molar ratio of components is 1:0.5:1.5; IEC=1.32 meq./g).

After drying, the synthesized membranes are semi-transparent films (FIG. 3 and FIG. 4) with good mechanical strength. The formation of sulfo-acid polyamide derivatives was confirmed by the IR-spectroscopy (FIG. 5) and ion exchange capacity (FIG. 6) data obtained from the synthesized film materials.

Properties of the Sulfo-Acid Products of the Present Invention

The physical-mechanical properties of the modified membranes both in dry and swelled states are somewhat different as compared to that of the polyamides used for their synthesis. The modified polyamides have fragments that provide increased mobility of the polyamide main chain, and this increases conductivity. Analyses have shown that the properties of the present film materials (such as water absorption, IEC and ion conductivity and the like) depend significantly on the nature and the ratio of initial components used for their synthesis.

Figure 8:
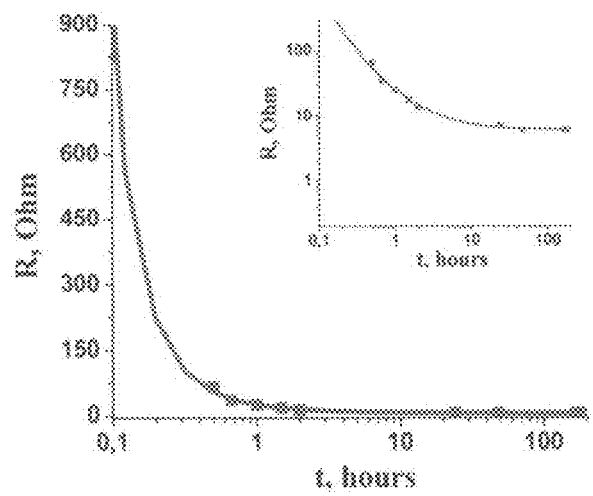
FIG. 8. Change of proton conducting membrane resistance of the polyamide-6:phenol sulfo-acid:$CH_2O$=1:0.5:1 (molar ratio) composition after swelling in 1M $H_2SO_4$ solution. Mechanical expansion or swelling from treatment with either water of 1M acid solutions was minimal.
Figure 9:
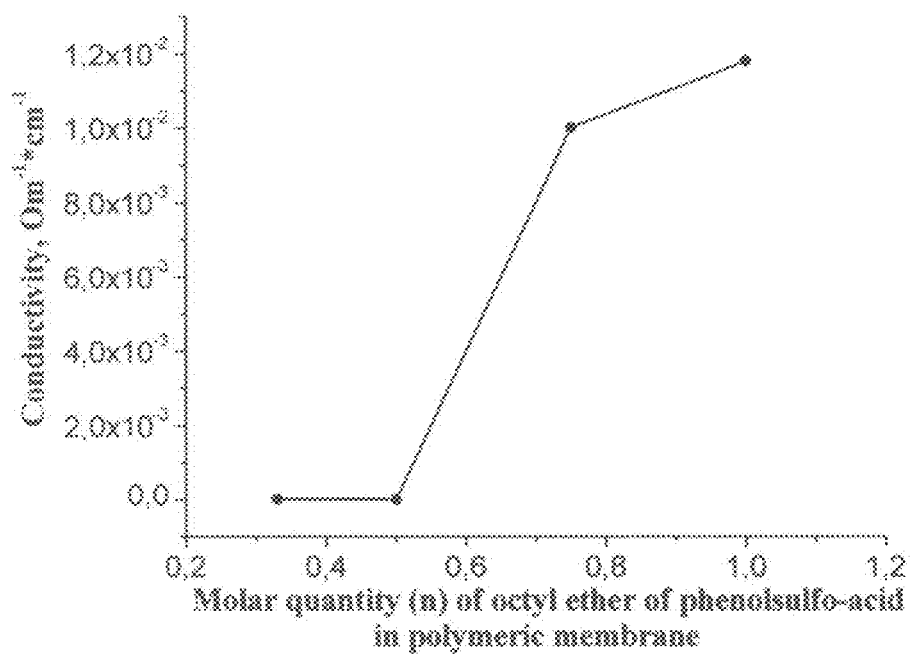
FIG. 9. Conductivity of polyamide sulfo-acid membranes based on composition polyamide-610:octyl ether of phenolsulfo-acid:formaldehyde at molar ratio 1:n:1. where n is the molar quantity of the octyl ether of phenolsulfo-acid in polymer membrane.
Figure 10:
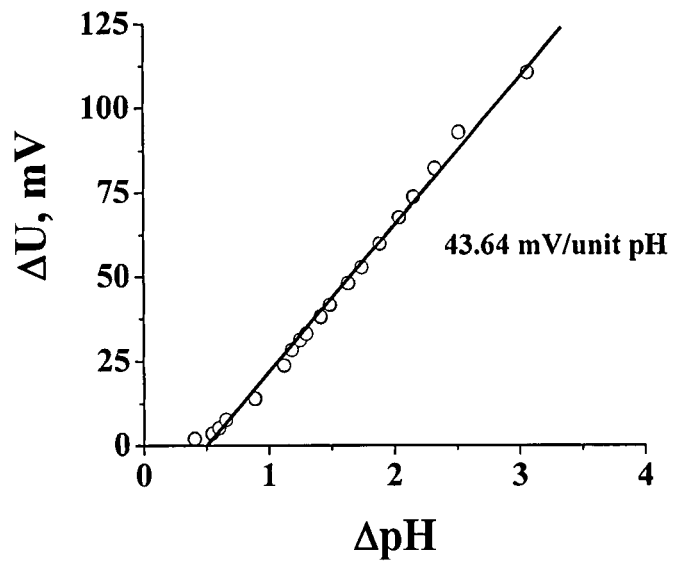
FIG. 10. Proton function of the non-modified polyamide membranes of composition polyamide-6: phenol sulfo-acid: $CH_2O$=1:0.5:1.5 (molar ratio).
Figure 11:
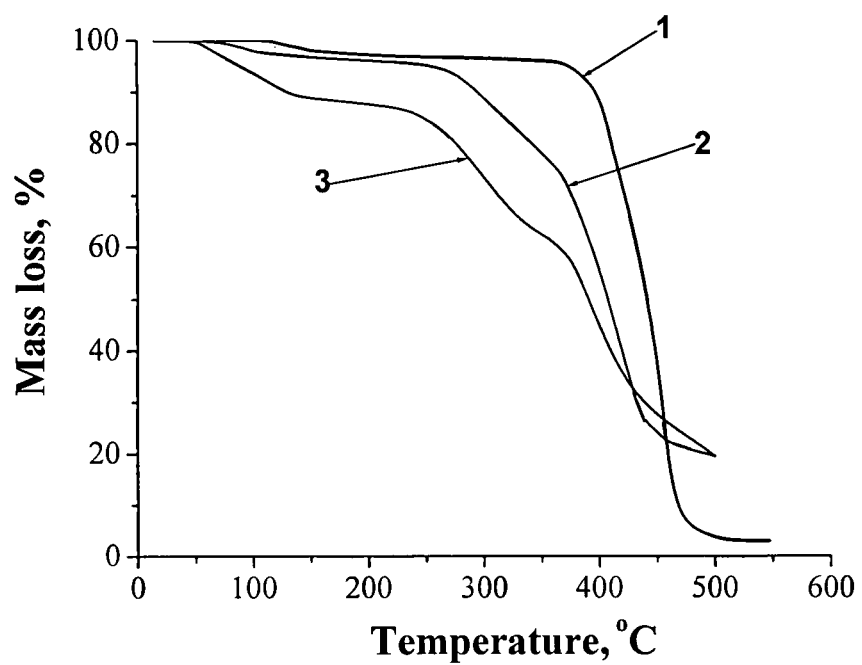
FIG. 11. Data from thermogravimetric analysis of sulfo-acid polyamides of the present invention showing percentage of mass lost as a function of temperature. 1 is initial polyamide-6; 2 is cross-linked composition polyamide-6:phenol sulfoacid:formaldehyde (molar ratio of components is 1:0.5:1; IEC=1.2 meq./g), and 3 is the cross-linked composition polyamide-6:phenol sulfoacid:formaldehyde (molar ratio of components is 1:0.75:1.5; IEC=1.65 meq./g). Data obtained indicate good thermal stability to approximately 250 degrees C.

The range of the water concentration in the membrane samples tested was ~130-300%. It should be noted that there was insignificant change in the geometric size of the membrane upon swelling in water or sulfuric acid solutions. The IEC of the synthesized materials ranges from 1.2 up to 1.65 meq/g (FIG. 6). Conductivity as a function of swelling time and polymer composition are shown in FIG. 7 with selected data from these analyses shown in FIG. 8. With the use of octyl ethers of phenolsulfo-acid, it is possible to obtain film materials with the conductivity on the order of ~$10^{-2}$ Sm·cm$^{-1}$. The conductivity of such materials increases with increase of sulfo-acid molar content (n) in a membrane (FIG. 9). FIG. 10 shows the proton function of the selected material. Thermogravimetric analysis of the resulting polymer is shown in FIG. 11.

The invention can be better understood with reference to the following examples:

Example 1

Synthesis of Phenol Sulfo-Acids

A mixture of 120 g (1.27 mol) phenol and 140.4 g (1.4 mol) 98% sulfuric acid is heated at 95-100° C. in a 500 ml round-bottom flask during 15 h. The hot reaction mass is poured out into a flask with ground-glass stopper. After crystallization, the resulting material is used to form films. One g of the mixture mix contains 0.0049 mol phenol sulfo-acid.

Example 2

Preparation of Amyl Phenyl Ether

In a 500 ml four-neck flask, load 115 g phenol (1.223 mol) and 82.2 g (1.468 mol) of dry KOH. A mass is heated up to 90° C. while mixing. Then by dropping during 0.5 h add 184.7 g (1.223 mol) of amylbromide. Maintain the mixture at a temperature of 95-100° C. for 45 minutes while mixing. After cooling, 200 ml of benzene and 300 ml of water are added to the mixture. The water layer is decanted. Then the benzene layer is washed with 200 ml of 5% solution of NaOH The benzene layer is then washed a few times with water until the reaction mixture is neutral.

The benzene layer is then distilled. The residual mass is distill under vacuum (10 millimeter of mercury). The fraction with a boiling temperature of 106-108° C. is selected. Yield amount is 135.2 g (67.4%), $n_D^{15}$ 1.4937.

Example 3

Preparation of Octylphenyl Ether

Under conditions described in Example 2, 94.1 g of octylphenyl ether (77.8%) was extracted from 113.4 g (0.587 mol) of octylbromide by boiling the mixture at a temperature of $T_{boiling}$=150-151° C. (under a vacuum of 10 millimeter of mercury), $n_D^{15}$ 1,4881.

Example 4

Preparation of Sulfo-Acid of Amylphenyl Ether 40.4 (0.402 mol) of 98% sulfuric acid was heated up to 70° C. while mixing. At a temperature 65-70° C., 33 g (0.201 mol) of amylphenyl ether was added over a period of 0.5 h. The resulting mixture was heated at 70° C. during 45 min, and then cooled. The resulting product was used without precipitation of the sulfo-acid derivative. The mixture contains 0.00274 mol of the sulfo-acid of amylphenyl ether.

Example 5

Preparation of Sulfo-Acid of Octylphenyl Ether

The process of the sulfonation of 17.7 g (0.0855 mol) of octylphenyl ether by 17.1 g (0.171 mol) with a 98% solution of sulfuric acid was carried out under the conditions described in Example 4. As result, a one g of mixture containing 0.00247 mol of sulfo-acid of octyl-phenyl ether was obtained.

Example 6

Preparation of Polyamide Sulfo-Acid Membrane Based on Polyamide-6: Phenol Sulfo-Acid:Formaldehyde Two g of polyamide-6 (0.0177 eqv. of NH-groups) is added to a flask with a ground-glass stopper containing a 10 ml of 90% solution of formic acid. The polymer dissolves in the acid over a 24 h period. The 1.2 g (0.0059 mol) of phenol-sulfo-acid as (obtained in Example 1) are added to the solution while mixing. Then 1.4 ml (0.0177 mol) of 35% formalin are added to the solution while mixing.

The resulting solution is placed under a vacuum of 15 millimeter of mercury. Then this solution is poured into a glass or Teflon-coated casting form. In this form the material is held at room temperature for 24 hours, and then held for 5 h at 50° C. The form is then cooled and disassembled. The gel-like film obtained after this step is immersed in the water for 24 h to remove unreacted monomer and catalyst ($H_2SO_4$) residue. The operation of the immersing the film in water was repeated three times. The conductivity of the resulting film (thickness 0.08 mm) was $4.3*10^{-4}$ $Om^{-1}*cm^{-1}$, and the protonic function is 37.3 mV/unit pH. The mechanical property parameter values of the film after drying at ambient temperature for one day were as follows:

| | |
|---|---|
| breaking stress: | 35.1 MPa |
| elongation: | 160% |
| elastic modulus: | 877 MPa |

The polymer membrane thus obtained is thermally stable at temperatures of up to 230° C.

Example 7

Determination of Ionic Conductivity and Proton Function

For determination of the ionic conductivity and proton function the membrane sample is placed in a two-chamber cell. The membrane forms hermetic seal between the chambers with the goal of preventing electrolyte. Both chambers are filled up with a solution of 1M $H_2SO_4$.

The ends of two silver chloride reference electrodes are placed on either side of the polymer membrane. One platinum electrode is placed in both chambers. These electrodes are used to provide current.

Electrical current was provided using a mini-potentiostat (Hewlett Packard E 3631A). The potential differences on the reference electrodes were measured with a multimeter KEITHLEY 619 ELECTROMETER/MULTIMETER. Using the platinum electrodes currents of different polarity were passed through the membrane to determine the potential differences seen by the silver chloride electrodes. The resulting dependence plot has a linear character. The slope of this plot gives the value of the membrane resistance. Taking into account the thickness of the membrane and its working area, the resulting change in membrane resistance upon swelling in 1M a solution $H_2SO_4$ (FIG. 7) and its conductivity (FIGS. 8 and 9) were calculated.

With the test cell still intact, a glass reference electrode connected to pH-meter SympHony VWR SR 40C was immersed in one of the chambers. In one of chambers the initial pH were fixed. After that in this chamber a solution of alkali (NaOH) was added. As the value of the pH in the chamber changed, a potentials difference between the of the silver chloride electrodes also changed accordingly. The dependence E, mV on the difference of the pH in different chambers was linear. The slope of this dependence is the proton function parameter value (FIG. 10).

Example 8

Preparing of Polyamide Sulfo-Acid Membrane Based on Composition Polyamide-610:Sulfonated Octylphenyl Ether:Formaldehyde A membrane was obtained was prepared according to the conditions of Example 6 based on 2 g of polyamide-610 (0.0142 eqv. of NH-groups) and 2.9 g (0.0071 mol) of octylphenyl sulfo-acid ether (obtained according to Example 5), and 1.1 ml (0.0142 mol) of 35% formalin in 15 ml of the 90% formic acid.

A difference between the process of Example 6 and the current Example (8) is that the film was cured for 24 h at room temperature and then for 2 h at 75° C.

The resulting polymer membrane was white in color, with a thickness of 0.2 mm Water content was 69.4%, and IEC=1.17 meqv./g Conductivity at room temperature was $1.2*10^{-4}$ $Sm*cm^{-1}$.

Example 9

Preparing of Polyamide Sulfo-Acid Membranes Based on Composition Polyamide-6:Sulfonated Amyl-Phenyl Ether:Formaldehyde A membrane was prepared according to the conditions of Example 7, based on 2 g of polyamide-6 (0.0177 eqv. of NH-groups), 2.1 g (0.0059 mol) of amylphenyl sulfo-acid ether (obtained as in Example 4), and 1.4 ml (0.0177 mol) of 35% formalin in 10 ml of 90% formic acid, The resulting film was white in color, with a thickness of 0.3 mm, and a conductivity of $3.78*10^{-3}$ Sm*cm$^{-1}$.

Closure

While various embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. A proton-conducting membrane comprising cross-linked polyamide sulfo-acid polymers having the formula:

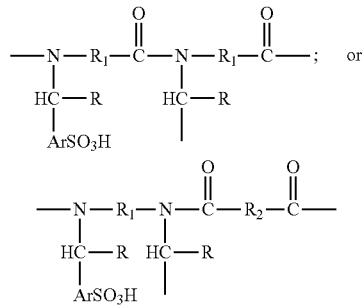

wherein, R is an aliphatic, aromatic or heterocyclic radical;
Ar is aromatic; and
$R_1$ and $R_2$ are bifunctional aliphatic, substituted aliphatic, aromatic or substituted aromatic radicals.

2. The proton-conducting polymer membrane according to claim 1, wherein said proton-conducting polymer is made by condensation of a polyamide, an aromatic sulfonic acid and an aldehyde, wherein said polyamide is selected from the group consisting of polycapromide (PA-6), poly(polyhexamethylene adipamide) (PA-66), poly(hexamethylene sebacilamide) (PA-610), polyhexamethylene-dodecandiamide (PA-612), polyundecane amide (PA-11), polydodecane amide (PA-12), polytetramethylene adipamide (PA-46), polyamides PA MXD6 or PA 6-3-T and poly-m-phenylene isophthalamide (phenylon, PPA).

3. The proton-conducting polymer membrane according to claim 1, wherein said proton-conducting polymer is made by condensation of a polyamide, an aromatic sulfonic acid and an aldehyde, wherein the aromatic sulfonic acid has the structure

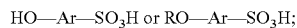

where R is alkyl $C_1$-$C_n$.

4. The proton-conducting polymer membrane according to claim 1, wherein said proton-conducting polymer is made by condensation of a polyamide, an aromatic sulfonic acid and an aldehyde, wherein the aldehyde has the structure:

where R is alkyl, substituted alkyl, aryl or heterocycle radical.

5. The proton-conducting polymer membrane of claim 1 where Ar is selected from the group consisting of phenol, alkyl phenyl ether and naphthalene radicals.

6. The proton-conducting polymer membrane according to claim 2, 3 or 4, wherein said condensation is carried out in a solvent selected from the group consisting of formic acid, sulphuric acid, and trichloroethanol.

7. The proton-conducting polymer membrane according to claim 2, 3 or 4, wherein said condensation is carried out in the presence of an acid catalyst selected from the group consisting of sulfuric acid, hydrochloric acid, chloric acid, p-toluene sulfonic acid, and benzene sulfonic acid.

8. The proton-conducting polymer membrane according to claim 7, wherein said acid catalyst is 90-98% sulfuric acid.

9. The proton-conducting polymer membrane of claim 3 wherein the aromatic sulfonic acid is selected from the group consisting of o-phenolsulfonic acid, p-phenolsulfonic acid, sulfonated amylphenyl ether, sulfonated octophenyl ether, sulfosalicylic acid, and naphthalene sulfonic acid.

10. The proton-conducting polymer membrane according to claim 4, wherein said aldehyde is a 30-40% solution in water.

11. The proton-conducting polymer membrane of claim 4 where the aldehyde is selected from the group consisting of formaldehyde, acetaldehyde, butyraldehyde, benzaldehyde, and furfurol.

12. A method of making a proton-conducting membrane comprising the steps of:
    preparing a reaction mixture in an organic solvent;
    processing the reaction mixture solution to produce a cross-linked polyamide sulfo-acid polymer material as a membrane;
    washing the this produced membrane to remove residual unreacted components; and
    drying the washed membrane material;
wherein said cross-linked polyamide sulfo-acid polymer material has the formula:

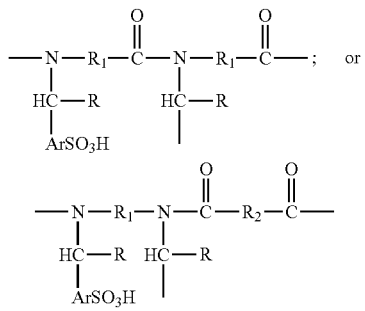

wherein, R is aliphatic, aromatic or heterocyclic;
Ar is an aromatic radical and
$R_1$ and $R_2$ are aliphatic, substituted aliphatic, aromatic or substituted aromatic radicals.

13. The method of claim 12, wherein said reaction mixture comprises a solution of polyamide, aromatic sulfonic acid, aldehyde, and acid catalyst.

14. The method of claim 13 wherein said polyamide is selected from the group consisting of polycapromide (PA-6), poly(polyhexamethylene adipamide) (PA-66), poly(hexamethylene sebacilamide) (PA-610), polyhexamethylene-dodecandiamide (PA-612), polyundecane amide (PA-11), polydodecane amide (PA-12), polytetramethylene adipamide (PA-46), polyamides PA MXD6 or PA 6-3-T and poly-m-phenylene isophthalamide (phenylon, PPA).

15. The method of claim 13 wherein the aromatic sulfonic acid has the structure

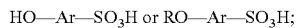

where R is alkyl $C_1$-$C_n$.

16. The method of claim 13 wherein the aldehyde has the structure:

where R is alkyl, substituted alkyl, aryl or heterocycle radical.

17. The method of claim 13 wherein said solvent is selected from the group consisting of formic acid, sulphuric acid, and trichloroethanol.

18. The method of claim 13 wherein said acid catalyst selected from the group consisting of sulfuric acid, hydrochloric acid, chloric acid, p-toluene sulfonic acid, and benzene sulfonic acid.

19. The method of claim 12, wherein said processing is carried out in a glass form, or wherein a thin film is cast on a glass or fluoroplastic surface.

* * * * *